United States Patent [19]

O'Dell et al.

[11] 4,062,425
[45] Dec. 13, 1977

[54] PRESSURE RELIEF VALVE FOR A GREASE GUN

[75] Inventors: David L. O'Dell; Leo A. Shaffer, both of Mishawaka, Ind.

[73] Assignee: Wheelabrator-Frye, Inc., Mishawaka, Ind.

[21] Appl. No.: 749,689

[22] Filed: Dec. 13, 1976

[51] Int. Cl.$^2$ .............................................. F16N 3/12
[52] U.S. Cl. ................................ 184/105 A; 222/397; 251/340
[58] Field of Search ............ 184/105 R, 105 A, 105 B, 184/105 C, 28; 222/397, 318, 507; 251/340; 137/609, 612.1; 141/383, 382

[56] References Cited

U.S. PATENT DOCUMENTS

| 2,615,598 | 10/1952 | Watkins et al. | 222/397 |
| 3,788,427 | 1/1974 | Fox et al. | 184/105 C |

Primary Examiner—David H. Brown
Attorney, Agent, or Firm—Wood, Herron & Evans

[57] ABSTRACT

A flow control handle for supplying lubricant to a grease fitting. The handle includes a flow control valve interiorly thereof, a handle extension and a manual trigger for controlling the flow control valve. A pressure relief valve is operable to relieve high pressure grease in the handle extension. This valve is an internally seating pin valve disposed in the wall of the handle extension which is spring biased to a closed position. The valve is opened by movement of the trigger into engagement with the valve stem to compress the spring. Movement of the trigger is in a direction opposite to that required to open the flow control valve whereby high pressure grease cannot enter the extension when the relief valve is open.

5 Claims, 3 Drawing Figures

PRESSURE RELIEF VALVE FOR A GREASE GUN

BACKGROUND OF THE INVENTION

This invention relates to grease guns and particularly to a pressure relief valve for high pressure grease guns. More particularly, this invention relates to a pressure relief valve for use with high pressure grease guns of the type having a coupling secured to the outlet end of the gun which prevents grease from being ejected from the gun except when the coupling is properly located over a grease fitting.

Grease guns of the type with which the invention of this application is utilized are conventionally used in automobile service stations to grease bearings of motor vehicles. The gun is in reality a manually operated control handle for controlling a valve which in turn controls the flow of grease through the handle. When the valve of the gun or control handle is manually opened, it connects the outlet end of the gun to a high pressure grease pump. The pump is usually operable to supply grease to the gun at a pressure of approximately 7,000 pounds per square inch depending upon the resistance encountered by the grease in the bearing to which the grease is supplied. The greater the resistance, the higher the pressure of the grease ejected from the gun.

In addition to lubricant flow control handles of the type just described, there are also so-called "booster" control handles or guns for lubricating motor vehicles. Booster control handles are used for supplying grease at still higher pressures to vehicle bearings. A conventional booster control is operable to boost the ratio of grease pressure from the inlet to the outlet by a two-to-one ratio, i.e., from 7,000 to 14,000 p.s.i. Generally, booster control handles or guns are used to grease bearings of trucks or motor vehicles which are heavily loaded.

Irrespective of the type of gun or control handle which is employed for greasing or lubricating motor vehicles, some form of coupling unit is required by the gun and the grease fitting of the vehicle to interconnect the gun to the fitting. One type of coupling is a "fail-safe" coupling described in U.S. Pat. No. 3,788,427, assigned to the assignee of this invention, wherein the coupling has a valve contained internally of it which prevents grease from being ejected from the gun except when the coupling is properly located over a grease fitting. The coupling disclosed in the aforementioned patent eliminates the possibility of a mechanic either deliberately or inadvertently injecting himself with grease discharged through the grease gun and connected coupling.

Very nearly all high pressure grease guns contain a pressure relief valve to enable the gun to be removed or disconnected from "frozen" or "no flow" grease fittings. The necessity for this relief valve stems from the fact that most grease gun couplings include a piston or collet for clamping onto a grease fitting. If the fitting is frozen so that there is no flow through it, the collet becomes clamped onto the fitting by the grease pressure generally on the order of 7,000 pounds per square inch or more acting on the collet. The coupling can then only be removed by relieving the grease pressure behind the piston, and this is generally accomplished by opening the pressure relief valve. In couplings of the fail-safe type, it is possible for an operator to activate the gun and inadvertently fill the extension tube and coupling with high pressure grease. Because grease cannot be ejected through the coupling unless it is secured over a grease fitting, high pressure grease behind the piston prevents any rearward movement of the piston and thereby precludes the coupling from subsequently being attached to a fitting. Alternatively, if the coupling is properly located over a fitting but the bearing being lubricated by the fitting is frozen so that there is no throughput of grease, the grease pressure behind the piston may prevent the collet from being removed from the fitting.

In any of the situations just described, the pressure of the grease in the extension tube must be relieved. To that end, a relief valve is located in the extension tube. If this relief valve is opened to too great an extent or if the gun is equipped with a fail-safe coupling unit and the gun is activated while the coupling valve is closed and the relief valve open, high pressure grease is ejected through the relief valve and a dangerous condition obtains.

It has therefore been an object of this invention to provide a relief valve for a grease gun which eliminates or minimizes the possibility of a mechanic deliberately or inadvertently permitting high pressure grease to be ejected through the relief valve. That is, it has been an objective of this invention to provide a relief valve for a grease gun which eliminates or minimizes the possibility of grease being discharged through the grease gun flow control handle when the relief valve is open. To this end, the improved grease gun or control handle relief valve of this invention includes a pin valve mounted in the wall of the handle extension which is internally seated therein and spring biased to a closed position by an external spring and which is opened by the manual control handle engaging the valve stem but which cannot be opened except by movement of the control handle in a direction opposite that required to open the flow control valve to actuate the grease gun. Consequently, the gun cannot be actuated when the relief valve is open and the gun is fail-safe and high pressure grease cannot be either deliberately or inadvertently ejected through the relief valve.

SUMMARY OF THE INVENTION

These and other objects of the invention are accomplished by providing a lubricant flow control handle including a handle body connected to a high pressure hose and having a flow control valve located interiorly thereof operable to permit the flow of grease through the handle on movement of a manually operable trigger in a direction towards the handle body. The flow control handle includes an extension connected to the end of the body opposite the hose connection. A pressure relief valve in the form of a pin valve is mounted in the extension and is seated internally thereof with the valve stem projecting externally of the handle extension. A spring surrounding the valve stem biases the valve to a closed position. The pressure relief valve is actuated by the manual trigger's engaging the valve stem and compressing the spring to lift the valve off its seat to open the valve. However, the trigger can only actuate the relief valve when the trigger is moved in a direction opposite that for actuating the flow control valve, e.g., in the direction away from the handle body. Consequently, although the handle actuates both the flow control valve and the pressure relief valve, it cannot do so at the same time.

DETAILED DESCRIPTION OF THE INVENTION

Figure 1:
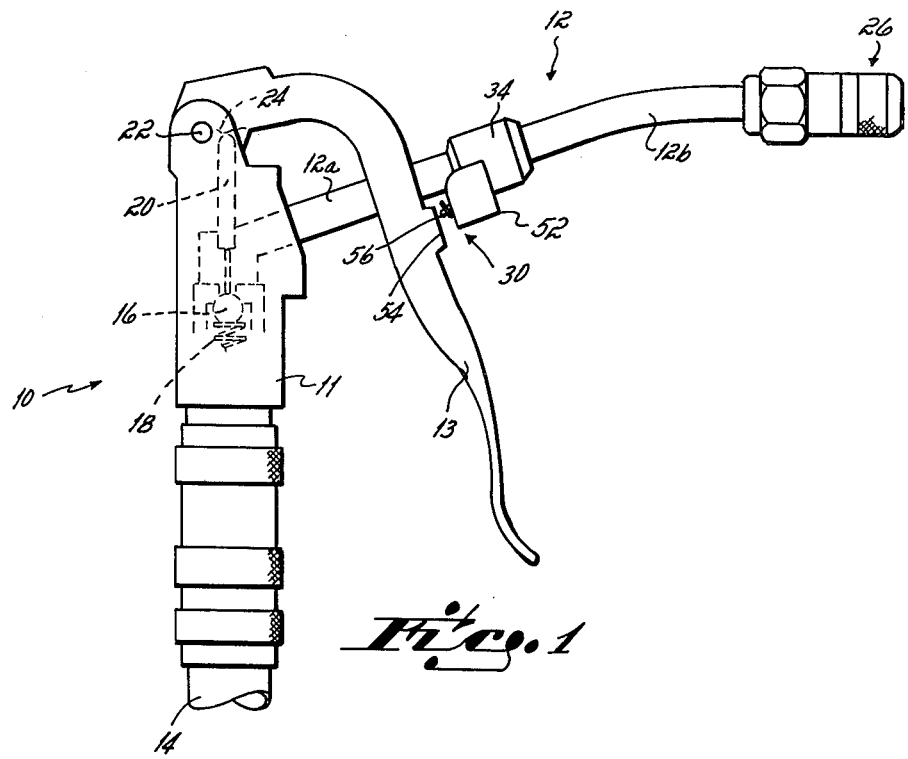
FIG. 1 is a side elevation view of a grease gun control handle upon which there is mounted a coupling and a pressure relief valve.

Referring first to FIG. 1, the high pressure grease gun 10 includes a control handle 11 and a handle extension tube 12. The handle 11 has a manual trigger 13 operated control valve for controlling the flow of grease from a high pressure hose 14 to and through the extension tube 12. The hose 14 is conventionally a double wire braid hose which interconnects the handle 11 to a source of grease or hydraulic lubricant through a high pressure pump (not shown). Conventionally, the pump is an air operated reciprocating piston pump which is operated by approximately 150 pounds air pressure and is operable to dischare grease or a lubricant at a pressure on the order of 7,000 p.s.i.

The valve mechanism contained within the handle 11 for controlling the flow of lubricant through the gun or handle comprises a ball 16 type valve which is normally urged by a spring 18 to a closed position. To open the valve and permit the throughput of high pressure grease from the hose 14 the trigger 13 actuates a valve plunger 20 which is slidably mounted above the ball 16 in the body of the handle 11. The trigger is pivotally mounted on the top of the handle, as indicated at 22, and has a first cam surface 24 engageable with the top of the plunger 20 so that movement of the trigger 13 from the position illustrated in FIG. 1 toward the body of the handle 11 (i.e., squeezing of the trigger) causes the cam surface 24 to engage the plunger 20 and move the plunger downwardly thereby opening the ball valve 16. Upon release of the handle, the valve is automatically closed by the spring 18.

Figure 2:
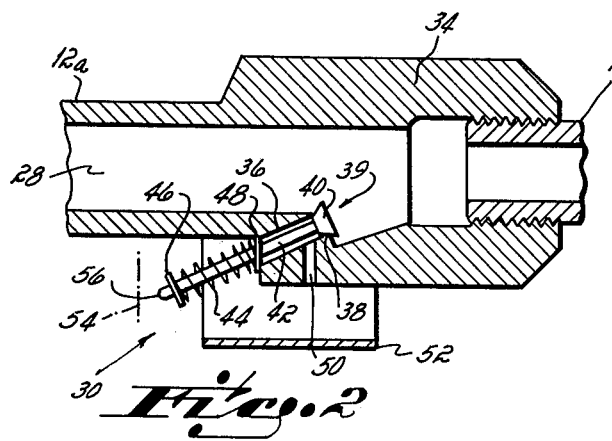
FIG. 2 is a cross-sectional view of the pressure relief valve showing the valve in its closed position.

At the opposite end of the extension tube is a coupling 26 which is operable to be secured to hydraulic grease fittings. A bore 28 (FIGS. 2 and 3) extends axially through the extension tube 12 and through the coupling 26 whereby grease can be delivered from the handle body 11 to the grease fitting. A suitable coupling is that described in the aforementioned U.S. Pat. No. 3,788,427. The pressure relief valve 30 for relieving grease pressure in the handle extension 12 is located in the extension tube 12 between the trigger 13 and the coupling 26.

The pressure relief valve 30 is mounted in the wall of the extension tube 12 which includes a first member 12a attached at one end to the handle body 11 and having an enlarged outer diameter at the other end 34. A second member 12b is internally threaded into the enlarged end 34. The enlarged end 34 of the handle extension 12 includes a bore 36 extending through the wall of the extension 12a terminating in an internal valve seat 38. A pin valve 39 is disposed in the bore 36 and includes a valve portion 40 and stem 42. A helical compression spring 44 surrounds the stem 42 and is held between washers 46 and 48. A second bore 50 communicates with the bore 36 through which the high pressure grease flows on actuation of the relief valve. A guard 52 surrounds the handle extension 12a in the vicinity of the bore 50 opening to contain the outflow of high pressure grease when the pressure in the extension is relieved.

In operation, the coupling 26 is forced by axial pressure over the end of a hydraulic grease fitting (not shown) until the coupling snaps onto the neck section of the fitting. The valve 16 contained within the control handle 11 is opened by movement of the trigger 13 towards the handle 11. At that time, high pressure lubricant or grease flows from the hose 14 through the handle 11, extension tube 12, and coupling 26 and into the fitting. So long as the trigger 13 is pulled rearwardly, high pressure grease continues to flow through the gun. When the trigger is released, valve 16 closes cutting off the flow of grease.

Figure 3:
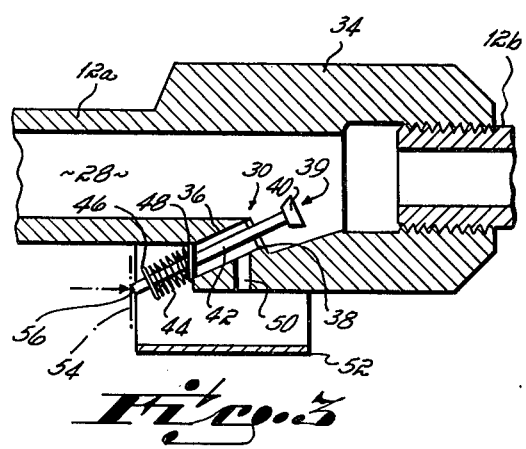
FIG. 3 is a cross-sectional view through the pressure relief valve showing the valve in its open position.

If for any reason the gun becomes frozen by high pressure grease in the extension tube 12, the pressure can be relieved by opening the pressure relief valve 30. The valve 30 is opened by means of the trigger 13 which includes a second cam surface 54 operable to engage the end 56 of the stem 42 when the trigger 13 is moved away from the handle body 11, i.e., in a direction opposite to that required to open the flow control valve 16. On engagement of the cam surface 54 with the stem end 56 and on continued movement of the trigger 13 away from the handle body 11, the spring 44 bias is overcome and the valve 40 is moved off the valve seat 38 (in FIG. 3 shown as movement up and to the right). Movement of the valve 40 off the valve seat 38 permits the high pressure grease in the handle extension 12 to be relieved through the bore 36 into and through the bore 50. The guard 52 deflects the exiting grease preventing any outwardly spurting grease which could cause an unsafe condition. Spring 44 limits the axial movement of the valve 30.

It is to be noted that when the trigger 13 is moved to actuate the pressure relief valve 30, the trigger 13 pivots counterclockwise about its mounting 22, and first cam surface 24 is lifted off the plunger 20. As a result, the valve 16 in the handle body 11 cannot be opened while the pressure relief valve is actuated.

When the grease pressure has been relieved, the pressure relief valve 30 automatically closes on release of the trigger 13. Spring 44 which had been compressed on opening of the valve now expands to force the valve to seat on seat 38 thereby closing the bore 36. The flow control valve 16 may now again be opened by the trigger 13 to permit flow of grease through the gun. Again, however, relief valve 30 closes automatically and when the valve 16 is opened, the trigger 13 is out of position and cannot actuate the relief valve 30. Moreover, the high pressure grease acting on the internally seated valve acts to maintain the valve seating.

Although the invention has been described in terms of a certain preferred embodiment, persons skilled in the art to which this invention pertains will readily appreciate modifications and changes which may be made without departing from the spirit of the invention. Therefore, I do not intend to be limited except by the scope of the appended claims.

Thus having described the invention, what is claimed is:

1. A lubricant flow control handle for supplying grease to a grease fitting, said handle comprising,
a handle body adapted to be connected at one end to a high pressure, grease containing hose, a handle extension connected at one end to the opposite end of said body, a valve containing coupling secured to the outlet end of said handle extension, said valve containing coupling being operable to prevent grease from being ejected from the handle extension except when said coupling is properly located over a grease fitting, a flow control valve located interiorly of said body and operable to control the flow of grease through said body and into said extension, pressure relief valve means operable to relieve high pressure grease entrapped in said extension, between said flow control valve and said valve containing coupling when both said flow control valve and said valve containing coupling are in a closed condition, said pressure relief valve means comprising a bore extending through the wall of said handle extension, a pin valve in said bore seating internally of said handle extension with its stem extending externally thereof, and spring means associated with said stem biasing said relief valve means to a valve closed position, and a manually operable trigger pivotally mounted upon said body, said trigger being operable on movement in a first direction from a neutral centered position to open said control valve and on movement from said neutral centered position in a direction opposite said first direction to open said pressure relief valve means, said trigger being normally maintained by spring pressure in said neutral centered position in which both said control valve and said pressure relief valve are closed.

2. The flow control handle of claim 1 in which said spring means of said pressure relief valve means is a helical spring surrounding the externally extending portion of said valve stem and is restrained between the handle extension and the external end of said stem.

3. The flow control handle of claim 1 further comprising a grease guard surrounding said pressure relief valve means.

4. The flow control valve of claim 1 in which said first direction is toward said handle body and said second direction is away from said handle body.

5. The flow control valve of claim 1 in which said trigger includes cam means operable to engage said stem of said pressure relief valve means on movement of said trigger in said opposite direction to compress said spring means and open said pressure relief valve means.

* * * * *